United States Patent
Chen et al.

(10) Patent No.: US 9,032,502 B1
(45) Date of Patent: *May 12, 2015

(54) SYSTEM AND METHOD FOR DISTRIBUTED MULTI-PROCESSING SECURITY GATEWAY

(71) Applicants: Lee Chen, Saratoga, CA (US); Ronald Wai Lun Szeto, San Francisco, CA (US)

(72) Inventors: Lee Chen, Saratoga, CA (US); Ronald Wai Lun Szeto, San Francisco, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,673

(22) Filed: Oct. 2, 2013

Related U.S. Application Data

(63) Continuation of application No. 13/666,979, filed on Nov. 2, 2012, now Pat. No. 8,595,819, which is a continuation of application No. 11/501,607, filed on Aug. 8, 2006, now Pat. No. 8,332,925.

(51) Int. Cl.
  *G06F 21/00* (2013.01)
  *H04L 29/08* (2006.01)
  *H04L 29/06* (2006.01)
(52) U.S. Cl.
  CPC ............... *H04L 67/28* (2013.01); *H04L 63/20* (2013.01); *H04L 63/0281* (2013.01)
(58) Field of Classification Search
  CPC .................................................. H04L 63/0281
  USPC .......................................................... 726/12
  See application file for complete search history.

(56) References Cited

U.S. PATENT DOCUMENTS

| 5,875,185 | A | * | 2/1999 | Wang et al. .................. 370/331 |
| 6,141,749 | A | | 10/2000 | Coss et al. |
| 6,167,428 | A | | 12/2000 | Ellis |
| 6,324,286 | B1 | | 11/2001 | Lai et al. |
| 6,360,265 | B1 | | 3/2002 | Falck et al. |
| 6,363,075 | B1 | * | 3/2002 | Huang et al. .................. 370/412 |
| 6,389,462 | B1 | * | 5/2002 | Cohen et al. .................. 709/218 |
| 6,415,329 | B1 | * | 7/2002 | Gelman et al. ................ 709/245 |
| 6,519,243 | B1 | | 2/2003 | Nonaka et al. |
| 6,535,516 | B1 | | 3/2003 | Leu et al. |
| 6,658,114 | B1 | | 12/2003 | Farn et al. |

(Continued)

FOREIGN PATENT DOCUMENTS

| CN | 1921457 | 2/2007 |
| CN | 1937591 | 3/2007 |

(Continued)

OTHER PUBLICATIONS

Chiussi et al., "A Network Architecture for MPLS-Based Micro-Mobility", IEEE WCNC 02, Orlando, Mar. 2002.

(Continued)

*Primary Examiner* — Morshed Mehedi
(74) *Attorney, Agent, or Firm* — Carr & Ferrell LLP

(57) ABSTRACT

A system and method for a distributed multi-processing security gateway establishes a host side session, selects a proxy network address for a server based on network information, and using the proxy network address to establish a server side session. The proxy network address is selected such that a same processing element is assigned to process data packets from the server side session and the host side session. The network information includes a security gateway network address and a host network address. By assigning processing elements in this manner, higher capable security gateways are provided.

22 Claims, 6 Drawing Sheets

(56) References Cited

U.S. PATENT DOCUMENTS

| | | | |
|---|---|---|---|
| 6,832,322 B1 | 12/2004 | Boden et al. | |
| 7,013,338 B1 | 3/2006 | Nag et al. | |
| 7,086,086 B2 | 8/2006 | Ellis | |
| 7,111,162 B1 | 9/2006 | Bagepalli et al. | |
| 7,266,604 B1 | 9/2007 | Nathan et al. | |
| 7,284,272 B2 | 10/2007 | Howard et al. | |
| 7,290,050 B1 | 10/2007 | Smith et al. | |
| 7,308,710 B2 * | 12/2007 | Yarborough | 726/11 |
| 7,406,709 B2 | 7/2008 | Maher, III et al. | |
| 7,441,270 B1 * | 10/2008 | Edwards et al. | 726/15 |
| 7,451,312 B2 * | 11/2008 | Medvinsky et al. | 713/168 |
| 7,516,485 B1 | 4/2009 | Lee et al. | |
| 7,529,242 B1 | 5/2009 | Lyle | |
| 7,568,041 B1 | 7/2009 | Turner et al. | |
| 7,583,668 B1 | 9/2009 | Mayes et al. | |
| 7,591,001 B2 | 9/2009 | Shay | |
| 7,603,454 B2 | 10/2009 | Piper | |
| 7,716,369 B2 | 5/2010 | Le Pennec et al. | |
| 7,779,130 B1 * | 8/2010 | Toutonghi | 709/227 |
| 7,908,651 B2 * | 3/2011 | Maher | 726/12 |
| 8,079,077 B2 | 12/2011 | Chen et al. | |
| 8,244,876 B2 | 8/2012 | Sollee | |
| 8,291,487 B1 | 10/2012 | Chen et al. | |
| 8,332,925 B2 | 12/2012 | Chen et al. | |
| 8,347,392 B2 | 1/2013 | Chess et al. | |
| 8,387,128 B1 | 2/2013 | Chen et al. | |
| 8,464,333 B1 | 6/2013 | Chen et al. | |
| 8,520,615 B2 * | 8/2013 | Mehta et al. | 370/329 |
| 8,595,383 B2 | 11/2013 | Chen et al. | |
| 8,595,819 B1 | 11/2013 | Chen et al. | |
| 2002/0026531 A1 * | 2/2002 | Keane et al. | 709/250 |
| 2002/0046348 A1 | 4/2002 | Brustoloni | |
| 2002/0053031 A1 * | 5/2002 | Bendinelli et al. | 713/201 |
| 2003/0065950 A1 * | 4/2003 | Yarborough | 713/201 |
| 2003/0088788 A1 | 5/2003 | Yang | |
| 2003/0167340 A1 | 9/2003 | Jonsson | |
| 2004/0054920 A1 | 3/2004 | Wilson et al. | |
| 2004/0107360 A1 | 6/2004 | Herrmann et al. | |
| 2004/0243718 A1 | 12/2004 | Fujiyoshi | |
| 2005/0027947 A1 | 2/2005 | Landin | |
| 2005/0033985 A1 | 2/2005 | Xu et al. | |
| 2005/0038898 A1 | 2/2005 | Mittig et al. | |
| 2005/0050364 A1 | 3/2005 | Feng | |
| 2005/0074001 A1 | 4/2005 | Mattes et al. | |
| 2005/0114492 A1 | 5/2005 | Arberg et al. | |
| 2005/0135422 A1 | 6/2005 | Yeh | |
| 2005/0144468 A1 | 6/2005 | Northcutt et al. | |
| 2005/0169285 A1 | 8/2005 | Wills et al. | |
| 2005/0251856 A1 * | 11/2005 | Araujo et al. | 726/12 |
| 2006/0062142 A1 * | 3/2006 | Appanna et al. | 370/219 |
| 2006/0063517 A1 * | 3/2006 | Oh et al. | 455/415 |
| 2006/0064440 A1 * | 3/2006 | Perry | 707/200 |
| 2006/0080446 A1 * | 4/2006 | Bahl | 709/227 |
| 2006/0126625 A1 | 6/2006 | Schollmeier et al. | |
| 2006/0195698 A1 | 8/2006 | Pinkerton et al. | |
| 2006/0227771 A1 | 10/2006 | Raghunath et al. | |
| 2007/0002857 A1 * | 1/2007 | Maher | 370/389 |
| 2007/0011419 A1 | 1/2007 | Conti | |
| 2007/0124487 A1 | 5/2007 | Yoshimoto et al. | |
| 2007/0177506 A1 | 8/2007 | Singer et al. | |
| 2007/0180226 A1 | 8/2007 | Schory et al. | |
| 2007/0180513 A1 | 8/2007 | Raz et al. | |
| 2007/0294694 A1 | 12/2007 | Jeter et al. | |
| 2008/0034111 A1 | 2/2008 | Kamath et al. | |
| 2008/0034419 A1 | 2/2008 | Mullick et al. | |
| 2008/0040789 A1 | 2/2008 | Chen et al. | |
| 2008/0216177 A1 | 9/2008 | Yokosato et al. | |
| 2008/0289044 A1 | 11/2008 | Choi | |
| 2009/0049537 A1 | 2/2009 | Chen et al. | |
| 2009/0113536 A1 | 4/2009 | Zhang et al. | |
| 2009/0210698 A1 | 8/2009 | Candelore | |
| 2010/0333209 A1 | 12/2010 | Alve | |
| 2011/0307606 A1 | 12/2011 | Cobb | |
| 2013/0262702 A1 | 10/2013 | Davis | |
| 2013/0315241 A1 | 11/2013 | Kamat et al. | |

FOREIGN PATENT DOCUMENTS

| | | |
|---|---|---|
| CN | 101495993 | 7/2009 |
| CN | 101878663 | 11/2010 |
| CN | ZL 200780001807.5 | 2/2011 |
| CN | 103365654 | 10/2013 |
| CN | 103428261 | 12/2013 |
| CN | 101878663 | 6/2014 |
| EP | 1720287 | 11/2006 |
| EP | 2575328 | 10/2008 |
| EP | 2057552 | 5/2009 |
| EP | 2215863 | 8/2010 |
| EP | 2667571 | 11/2013 |
| HK | 1182547 | 11/2013 |
| HK | 1188498 | 5/2014 |
| HK | 1190539 A | 7/2014 |
| JP | 2004350188 | 12/2004 |
| JP | 2005-518595 | 6/2005 |
| JP | 2006180295 | 7/2006 |
| JP | 2006333245 | 12/2006 |
| JP | 2007048052 | 2/2007 |
| JP | 2011505752 | 2/2011 |
| JP | 5480959 | 2/2013 |
| JP | 2013059122 | 3/2013 |
| JP | 2013070423 | 4/2013 |
| JP | 2013078134 | 4/2013 |
| JP | 5364101 | 9/2013 |
| WO | 03073216 | 9/2003 |
| WO | 03103233 | 12/2003 |
| WO | 2006065691 | 6/2006 |
| WO | 2007076883 | 7/2007 |
| WO | 2008021620 | 6/2009 |
| WO | 2009073295 | 6/2009 |

OTHER PUBLICATIONS

Smith, M. et al; "Network Security Using NAT and NAPT", 10th IEEE International Converence on Aug. 27-30, 2002, Piscataway, NJ, USA, 2012; Aug. 27, 2002; pp. 355-360.

Cardellini et al., "Dynamic Load Balancing on Web-server Systems", IEEE Internet Computing, vol. 3, No. 3, pp. 28-39, May-Jun. 1999.

Wang et al., "Shield: Vulnerability Driven Network Filters for Preventing Known Vulnerability Exploits", SIGCOMM'04, Aug. 30-Sep. 3, 2004, Portland, Oregon, USA.

* cited by examiner

SYSTEM AND METHOD FOR DISTRIBUTED MULTI-PROCESSING SECURITY GATEWAY

CROSS-REFERENCE TO RELATED APPLICATIONS

This patent application is a continuation of, and claims the priority benefit of, U.S. patent application Ser. No. 13/666,979 filed on Nov. 2, 2012, now U.S. Pat. No. 8,595,819 issued on Nov. 26, 2013, and entitled "System and Method for Distributed Multi-Processing Security Gateway," which in turn is a continuation of U.S. patent application Ser. No. 11/501,607 filed on Aug. 8, 2006, now U.S. Pat. No. 8,332,925 issued on Dec. 11, 2012, and entitled "System and Method for Distributed Multi-Processing Security Gateway." The disclosures of all of the above are incorporated herein by reference in their entirety.

TECHNICAL FIELD

This invention relates generally to data networking, and more specifically, to a system and method for a distributed multi-processing security gateway.

BACKGROUND

Data network activities increases as more and more computers are connected through data networks, and more and more applications utilize the data networks for their functions. Therefore, it becomes more important to protect the data network against security breaches.

There are currently many security gateways such as firewalls, VPN firewalls, parental control appliances, email virus detection gateways, special gateways for phishing and spyware, intrusion detection and prevention appliances, access control gateways, identity management gateways, and many other types of security gateways. These products are typical implemented using a general purpose micro-processor such as Intel Pentium, an AMD processor or a SPARC processor, or an embedded micro-processor based on RISC architecture such as MIPS architecture, PowerPC architecture, or ARM architecture.

Micro-processor architectures are limited in their processing capability. Typically they are capable of handling up to a gigabit per second of bandwidth. In the past few years, data network bandwidth utilization increases at a pace faster than improvements of microprocessor capabilities. Today, it is not uncommon to see multi-gigabit per second of data network bandwidth utilization in many medium and large secure corporate data networks. It is expected such scenarios to become more prevailing in most data networks, including small business data network, residential networks, and service provider data networks.

The trend in the increasing usage of data networks illustrates a need for better and higher capable security gateways, particularly in using multiple processing elements, each being a micro-processor or based on micro-processing architecture, to work in tandem to protect the data networks.

SUMMARY

A system and method for a distributed multi-processing security gateway establishes a host side session, selects a proxy network address for a server based on network information, and using the proxy network address to establish a server side session. The proxy network address is selected such that a same processing element is assigned to process data packets from the server side session and the host side session. The network information includes a security gateway network address and a host network address. By assigning processing elements in this manner, higher capable security gateways are provided.

DETAILED DESCRIPTION

Figure 1A:
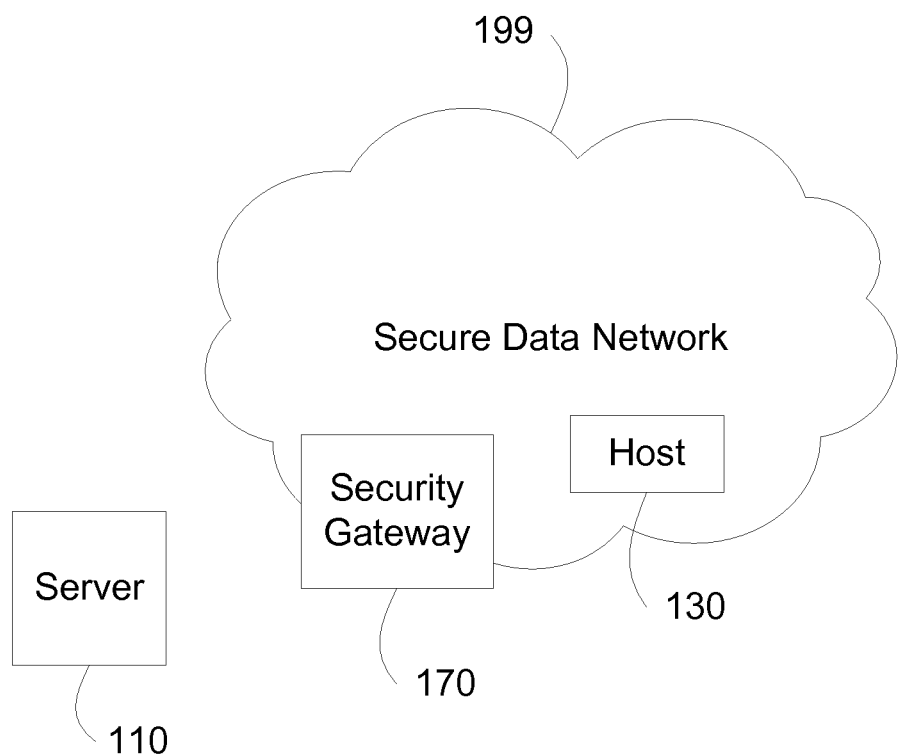
FIG. 1a illustrates a secure data network.

FIG. 1a illustrates a secure data network. Security gateway 170 protects a secure data network 199.

In one embodiment, secure data network 199 is a residential data network. In one embodiment, secure data network 199 is a corporate network. In one embodiment, secure data network 199 is a regional corporate network. In one embodiment, secure data network 199 is a service provider network.

In one embodiment, security gateway 170 is a residential broadband gateway. In one embodiment, security gateway 170 is a corporate firewall. In one embodiment, security gateway 170 is a regional office firewall or a department firewall. In one embodiment, security gateway 170 is a corporate virtual private network (VPN) firewall. In one embodiment, security gateway 170 is an Internet gateway of a service provider network.

When host 130 inside secure data network 199 accesses a server 110 outside secure data network 199, host 130 establishes a session with server 110 through security gateway 170. Data packets exchanged within the session, between host 130 and server 110, pass through security gateway 170. Security gateway 170 applies a plurality of security policies during processing of the data packets within the session. Examples of security policies include network address protection, content filtering, virus detection and infestation prevention, spyware or phishing blocking, network intrusion or denial of service prevention, data traffic monitoring, or data traffic interception.

Figure 1B:
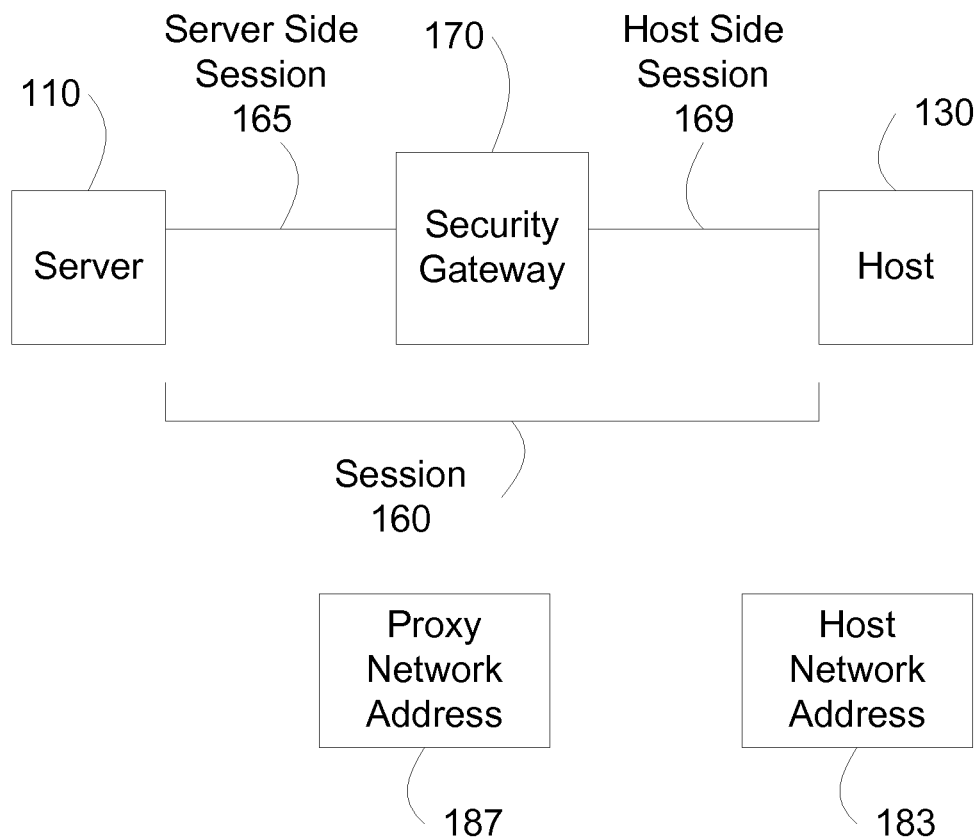
FIG. 1b illustrates an overview of a network address translation (NAT) process.

FIG. 1b illustrates an overview of a network address translation (NAT) process.

In one embodiment, a security policy is to protect network address of host 130. Host 130 uses a host network address 183 in a session 160 between host 130 and server 110. In one embodiment, the host network address 183 includes an IP address of host 130. In another embodiment, the host network address 183 includes a session port address of host 130.

Security gateway 170 protects host 130 by not revealing the host network address 183. When host 130 sends a session request for session 160 to security gateway 170, the session request includes host network address 183.

Security gateway 170 establishes host side session 169 with host 130. Host 130 uses host network address 183 in session 169.

Security gateway 170 selects a proxy network address 187. Security gateway 170 uses proxy network address 187 to establish server side session 165 with server 110.

Server side session 165 is the session between security gateway 170 and server 110. Host side session 169 is the session between security gateway 170 and host 130. Session 160 includes server side session 165 and host side session 169.

Security gateway 170 performs network address translation (NAT) process on session 160. Security gateway 170 performs network address translation process on data packets received on server side session 165 by substituting proxy network address 187 with host network address 183. Security gateway 170 transmits the translated data packets onto host side session 169. Similarly, security gateway 170 performs network address translation process on data packets received on host side session 169 by substituting host network address 183 with proxy network address 187. Security gateway 170 transmits the translated data packets onto server side session 165.

In one embodiment, session 160 is a transmission control protocol (TCP) session. In one embodiment, session 160 is a user datagram protocol (UDP) session. In one embodiment, session 160 is an internet control messaging protocol (ICMP) session. In one embodiment, session 160 is based on a transport session protocol on top of IP protocol. In one embodiment, session 160 is based on an application session protocol on top of IP protocol.

Figure 1C:
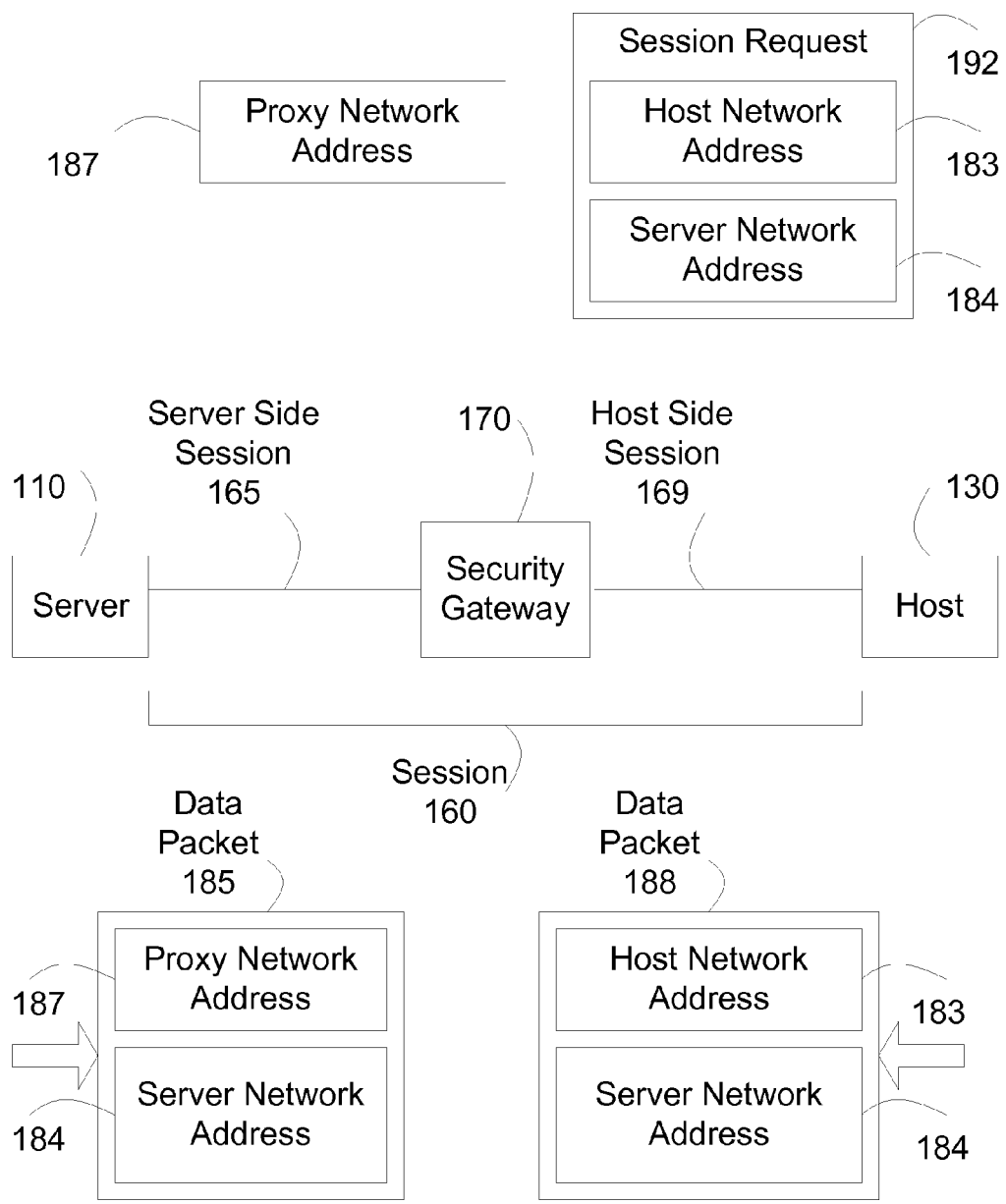
FIG. 1c illustrates a NAT process for a TCP session.

FIG. 1c illustrates a NAT process for a TCP session.

Host 130 sends a session request 192 for establishing a session 160 with server 110. Session 160 is a TCP session. Session request 192 includes host network address 183 and server network address 184. Security gateway 170 receives session request 192. Security gateway 170 extracts host network address 183 from session request 192. Security gateway 170 determines a proxy network address 187. In one embodiment, host network address 183 includes a host's IP address, and security gateway 170 determines a proxy IP address to substitute host's IP address. In one embodiment, host network address 183 includes a host's TCP port number, and security gateway 170 determines a proxy TCP port number to substitute host's TCP port number. Security gateway 170 extracts server network address 184 from session request 192. Security gateway 170 establishes a server side session 165 with server 110 based on server network address 184 and proxy network address 187. Server side session 165 is a TCP session.

Security gateway 170 also establishes a host side session 169 with host 130 by responding to session request 192.

After establishing server side session 165 and host side session 169, security gateway 170 processes data packets from server side session 165 and host side session 169.

In one embodiment, security gateway 170 receives a data packet 185 from server side session 165. Data packet 185 includes server network address 184 and proxy network address 187. Security gateway 170 extracts server network address 184 and proxy network address 187. Security gateway 170 determines host side session 169 based on the extracted network addresses. Security gateway 170 further determines host network address 183 from host side session 169. Security gateway 170 modifies data packet 185 by first substituting proxy network address 187 with host network address 183. Security gateway 170 modifies other parts of data packet 185, such as TCP checksum, IP header checksum. In one embodiment, security gateway 170 modifies payload of data packet 185 by substituting any usage of proxy network address 187 with host network address 183.

After security gateway 170 completes modifying data packet 185, security gateway 170 transmits the modified data packet 185 onto host side session 169.

In a similar fashion, security gateway 170 receives a data packet 188 from host side session 169. Data packet 188 includes server network address 184 and host network address 183. Security gateway 170 extracts server network address 184 and host network address 183. Security gateway 170 determines server side session 165 based on the extracted network addresses. Security gateway 170 further determines proxy network address 187 from server side session 165. Security gateway 170 modifies data packet 188 by first substituting host network address 183 with proxy network address 187. Security gateway 170 modifies other parts of data packet 188, such as TCP checksum, IP header checksum. In one embodiment, security gateway 170 modifies payload of data packet 188 by substituting any usage of host network address 183 with proxy network address 187.

After security gateway 170 completes modifying data packet 188, security gateway 170 transmits the modified data packet 188 onto server side session 165.

Figure 2:
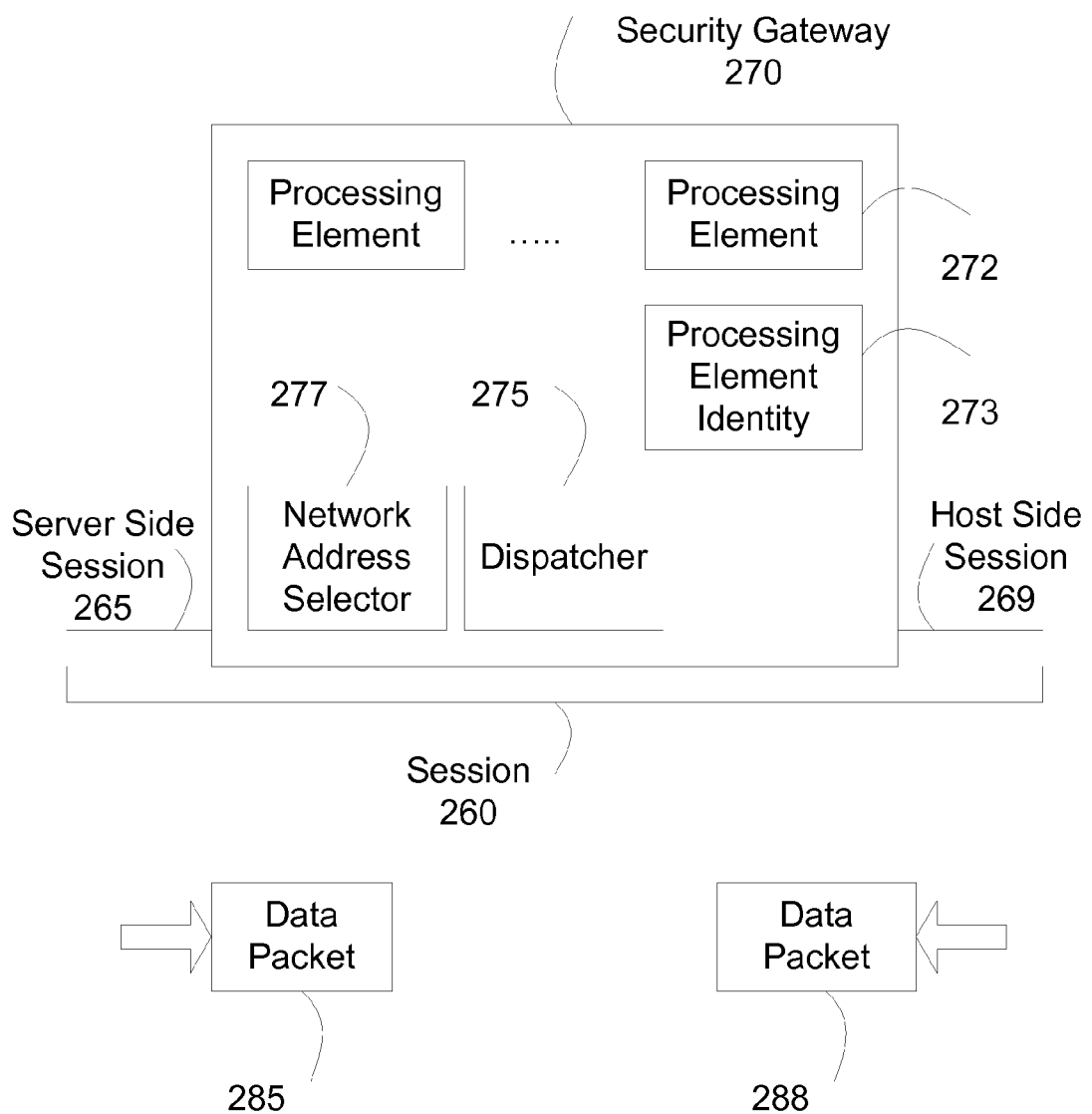
FIG. 2 illustrates a distributed multi-processing security gateway.

FIG. 2 illustrates a distributed multi-processing security gateway.

In one embodiment, security gateway 270 is a distributed multi-processing system. Security gateway 270 includes a plurality of processing elements. A processing element 272 includes a memory module. The memory module stores host network addresses, proxy network addresses and other information for processing element 272 to apply security policies as described in FIG. 1. Processing element 272 has a processing element identity 273.

Security gateway 270 includes a dispatcher 275. Dispatcher 275 receives a data packet and determines a processing element to process the data packet. Dispatcher 275 typically calculates a processing element identity based on the data packet. Based on the calculated processing element identity, security gateway 270 assigns the data packet to the identified processing element for processing.

In one embodiment, dispatcher 275 receives a data packet 288 from host side session 269 and calculates a first processing element identity based on the host network address and server network address in data packet 288. In another embodiment dispatcher 275 receives a data packet 285 from server side session 265 and calculates a second processing element identity based on the proxy network address and server network address in data packet 285.

Security gateway 270 includes a network address selector 277. Network address selector 277 selects a proxy network address based on network information. The network information includes a host network address obtained in a session request for session 260 and a security gateway network address. Other types of network information may also be used. The proxy network address is used to establish server side session 265. The proxy network address is selected such that the first processing element identity and the second processing element identity calculated by dispatcher 275 are the same. In other words, a same processing element is assigned to process data packet 285 from server side session 265 and data packet 288 from host side session 269.

Figure 3:
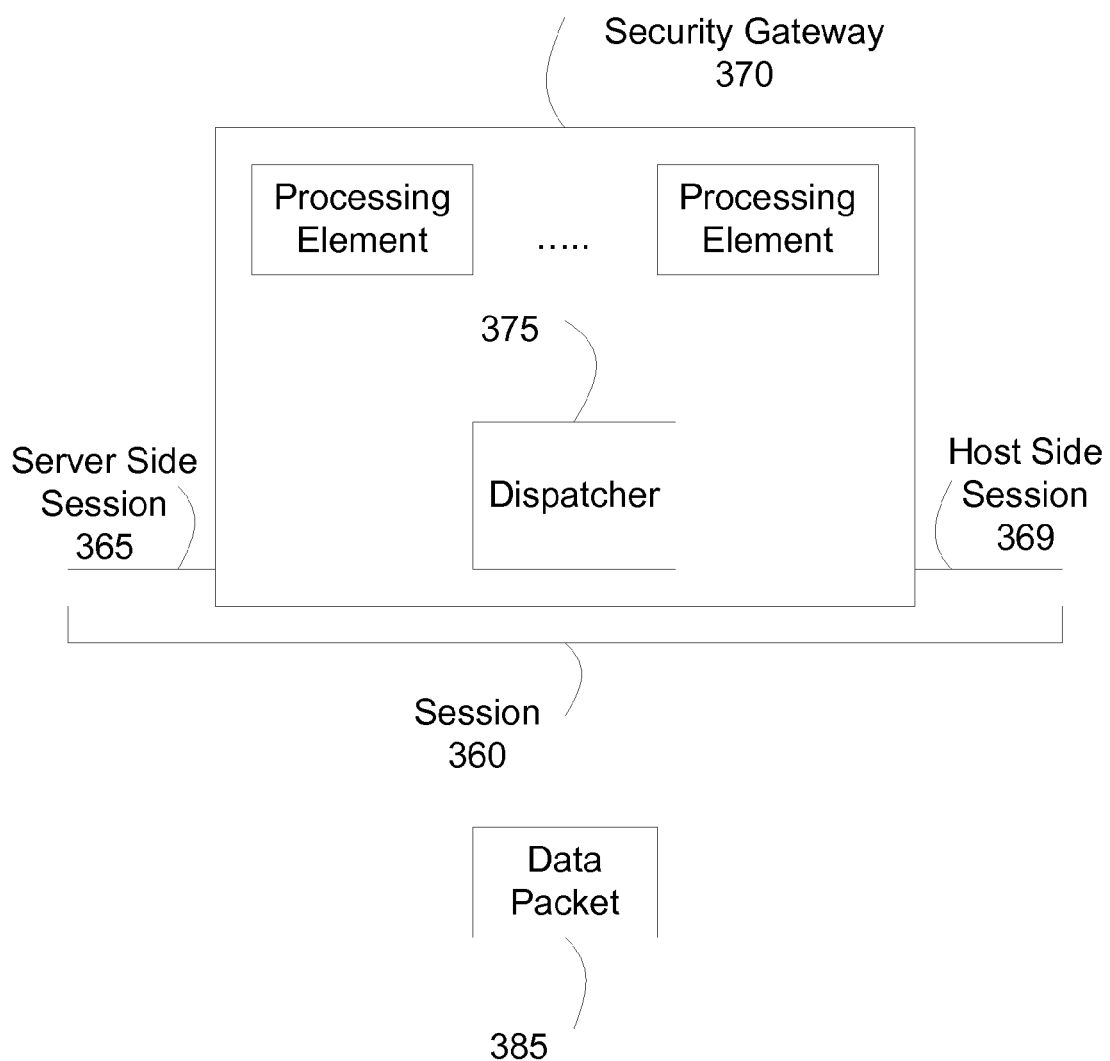
FIG. 3 illustrates a dispatching process.

FIG. 3 illustrates a dispatching process.

Dispatcher 375 calculates a processing element identity based on two network addresses obtained from a data packet 385 of session 360. Session 360 includes host side session 369 and server side session 365. The two network addresses of host side session 369 are server network address and host network address. The two network addresses of server side session 365 are proxy network address and server network address. Dispatcher 375 calculates to the same processing element identity for host side session 369 and server side session 365.

In one embodiment, dispatcher 375 calculates based on a hashing function.

In one embodiment, dispatcher 375 computes a sum by adding the two network addresses. In one example, dispatcher 375 computes a sum by performing a binary operation, such as an exclusive or (XOR) binary operation, or an and (AND) binary operation, onto the two network addresses in binary number representation. In one example, dispatcher 375 computes a sum by first extracting portions of the two network addresses, such as the first 4 bits of a network address, and applies an operation such as a binary operation to the extracted portions. In one example, dispatcher 375 computes a sum by first multiplying the two network addresses by a number, and by applying an operation such as addition to the multiple.

In one embodiment, dispatcher 375 computes a processing element identity by processing on the sum. In one embodiment, there are 4 processing elements in security gateway 370. In one example, dispatcher 375 extracts the first two bits of the sum, and interprets the extracted two bits as a numeric number between 0 and 3. In one example, dispatcher 375 extracts the first and last bit of the sum, and interprets the extracted two bits as a numeric number between 0 and 3. In one example, dispatcher 375 divides the sum by 4 and determines the remainder of the division. The remainder is a number between 0 and 3.

In one embodiment, security gateway 370 includes 8 processing elements. Dispatcher 375 extracts 3 bits of the sum and interprets the extracted three bits as a numeric number between 0 and 7. In one example, dispatcher 375 divides the sum by 8 and determines the remainder of the division. The remainder is a number between 0 and 7.

In one embodiment, a network address includes an IP address and a session port address. Dispatcher 375 computes a sum of the IP addresses and the session port addresses of the two network addresses.

Though the teaching is based on the above description of hashing functions, it should be obvious to the skilled in the art to implement a different hashing function for dispatcher 375.

Figure 4:
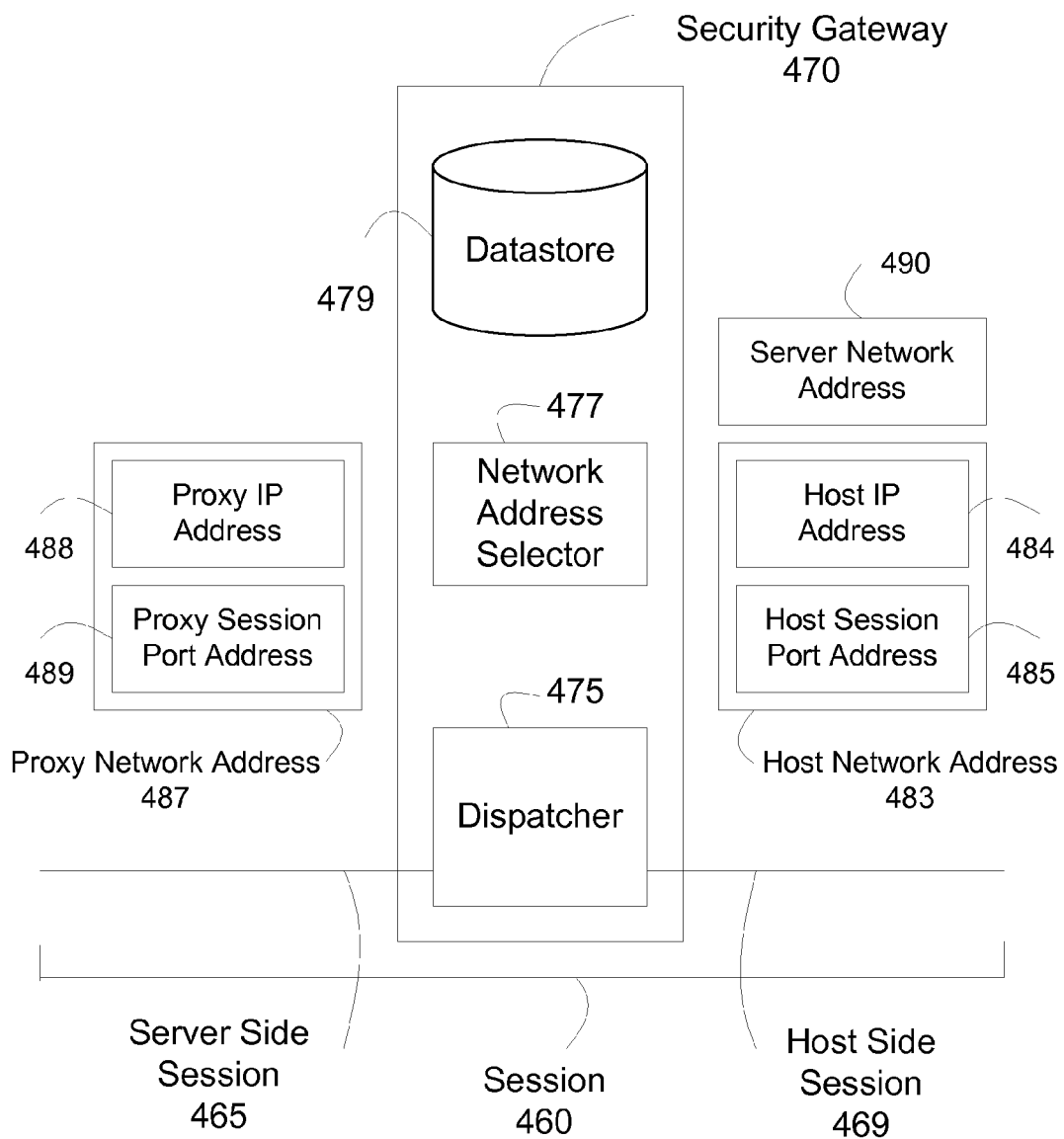
FIG. 4 illustrates a proxy network address selection process.

FIG. 4 illustrates a proxy network address selection process.

Network address selector 477 selects a proxy network address 487 for a host network address 483. In one embodiment, host network address 483 includes a host IP address 484 and a host session port address 485; proxy network address 487 includes a proxy IP address 488 and a proxy session port address 489. Proxy network address 487 is selected such that dispatcher 475 calculates to the same processing element identity on host side session 469 and server side session 465. Session 460 includes server side session 465 and host side session 469.

In one embodiment, the selection process is based on the dispatching process, illustrated in FIG. 3. In one example, dispatcher 475 uses the method of computing the sum of two IP addresses, and two session port addresses, and then divides the sum by 4. In one embodiment, network address selector 477 first selects proxy IP address 488. Network address selector 477 then selects proxy session port address 489 such that when using the method on server network address 490 and host network address 483 dispatcher 475 calculates the same processing element identity as when using the method on server network address 490 and proxy network address 487.

In one example, dispatcher 475 computes a sum from a binary operator XOR of the two network addresses, and extracts the last 3 digits of the sum. Network address selector 477 selects a proxy session port address 489 that has the same last 3 digits of the host session port address 485.

In one embodiment, security gateway 470 performs network address translation process for a plurality of existing sessions. Network address selector 477 checks if the selected proxy network address 487 is not used in the plurality of existing sessions. In one embodiment, security gateway 470 includes a datastore 479. Datastore 479 stores a plurality of proxy network addresses used in a plurality of existing sessions. Network address selector 477 determines the selected proxy network address 487 is not used by comparing the selected proxy network address 487 against the stored plurality of proxy network addresses and not finding a match.

In one embodiment, a processing element includes network address selector. A processing element receives a data packet assigned by security gateway based on a processing element identity calculated by dispatcher. In one embodiment, the processing element determines that the data packet includes a session request. The network address selector in the processing element selects a proxy network address based on the host network address in the session request as illustrated in FIG. 4.

In one embodiment, a particular first processing element includes network address selector. A second processing element without network address selector receives a data packet and determines that the data packet includes a session request. The second processing element sends the data packet to the first processing element using, for example, a remote function call. The first processing element receives the data packet. The network address selector selects a proxy network address based on the host network address in the session request.

In one embodiment, datastore is implemented in the memory module of a processing element. In one embodiment, the plurality of proxy network addresses in datastore are stored in each of the memory modules of each of the processing elements. In one embodiment, the plurality of proxy network addresses in datastore are stored in the memory modules in a distributive manner, with the proxy network addresses used in the sessions processed by a processing element stored in the memory module of the processing element.

In one embodiment, security gateway includes a memory shared by the plurality of process elements. Security gateway partitions the shared memory into memory regions. A process element has access to a dedicated memory region, and does not have access to other memory regions.

In one embodiment, security gateway includes a central processing unit. In one embodiment, the central process unit includes a plurality of processing threads such as hyperthread, micro-engine or other processing threads implemented in circuitry such as application specific integrated circuit (ASIC) or field programmable gate array (FPGA). A processing element is a processing thread.

In one embodiment, a central processing unit includes a plurality of micro-processor cores. A processing thread is a micro-processor core.

In one embodiment, a security policy is for virus detection or blocking. In one embodiment, a security policy is for phishing detection or blocking. In one embodiment, a security policy is for traffic quota enforcement. In one embodiment, a security policy is for lawful data interception.

In one embodiment, the NAT process is for a UDP session. In one embodiment, security gateway receives a UDP packet. In one embodiment, security gateway determines that the UDP packet is not from an existing session. Security gateway processes the UDP packet as a session request.

In one embodiment, the NAT process is for an ICMP session. In a similar fashion, security gateway processes an ICMP packet from a non-existing session as a session request.

What is claimed is:

1. A method for providing a network gateway, comprising:
   receiving by the network gateway a session request for a session between a host and a server, the session request comprising a host network address and a server network address;
   establishing by the network gateway a host side session between the network gateway and the host, the network gateway comprising a plurality of processors;
   selecting by the network gateway a proxy network address for the host based on network information, the network information comprising the host network address and a network gateway network address,
      wherein the proxy network address is selected such that a calculated first processor identity by the network gateway is the same as a calculated second processor identity by the network gateway;
   establishing by the network gateway a server side session between the network gateway and the server using the selected proxy network address;
   in response to receiving a first data packet from the host side session, calculating by the network gateway the first processor identity, comprising:
      assigning a first processor with the first processor identity to process the first data packet,
      modifying the first data packet by substituting the host network address in the first data packet with the selected proxy network address, and
      sending the modified first data packet to the server side session; and
   in response to receiving a second data packet from the server side session, calculating by the network gateway the second processor identity, comprising:
      assigning a second processor with the second processor identity to process the second data packet.

2. The method of claim 1, wherein the calculated first processor identity by the network gateway is based at least in part on the server network address and the host network address.

3. The method of claim 1, wherein the calculated second processor identity by the network gateway is based at least in part on the proxy network address and the server network address.

4. The method of claim 1, wherein the assigning the first processor with the first processor identity to process the first data packet comprises:
   processing the first data packet according to a security policy by the first processor.

5. The method of claim 4, wherein the security policy comprises one or more of the following: intrusion detection; virus detection; traffic quota violation; and lawful data interception.

6. The method of claim 1, wherein the assigning the second processor with the second processor identity to process the second data packet comprises:
   processing the second data packet according to a security policy by the second processor.

7. The method of claim 6, wherein the security policy comprises one or more of the following: virus detection; traffic quota violation; lawful data interception; and phishing.

8. The method of claim 1, wherein the selected proxy network address comprises an IP address.

9. The method of claim 8, wherein the selected proxy network address further comprises a TCP or UDP port.

10. The method of claim 1, wherein the calculated first processor identity by the network gateway is based at least in part on a computed sum of an IP address for the server network address and an IP address for the host network address.

11. The method of claim 1, wherein the calculated second processor identity by the network gateway is based at least in part on a computed sum of an IP address for the proxy network address and an IP address for the server network address.

12. A computer program product comprising a non-transitory computer readable medium having a computer readable program, wherein the computer readable program when executed on a computer causes the computer to:
   receive a session request for a session between a host and a server, the session request comprising a host network address and a server network address;
   establish a host side session between a network gateway and the host, the network gateway comprising a plurality of processors;
   select a proxy network address for the host based on network information, the network information comprising the host network address and a network gateway network address, wherein the proxy network address is selected such that a calculated first processor identity by the network gateway is the same as a calculated second processor identity by the network gateway;
   establish a server side session between the network gateway and the server using the selected proxy network address;
   in response to receiving a first data packet from the host side session, calculate the first processor identity, comprising:
      assign a first processor with the first processor identity to process the first data packet,
      modify the first data packet by substituting the host network address in the first data packet with the selected network address, and
      send the modified first data packet to the server side session; and
   in response to receiving a second data packet from the server side session, calculate the second processor identity, comprising:
      assign a second processor with the second processor identity to process the second data packet.

13. The computer program product of claim 12, wherein the calculate the first processor identity is based at least in part on the server network address and the host network address.

14. The computer program product of claim 12, where in the calculate the second processor identity is based at least in part on the proxy network address and the server network address.

15. The computer program product of claim 12, wherein the assign the first processor with the first processor identity to process the first data packet comprises:
   process the first data packet according to a security policy by the first processor.

16. The computer program product of claim 15, wherein the security policy comprises one or more of the following: intrusion detection; virus detection; traffic quota violation; and lawful data interception.

17. The computer program product of claim 12, wherein the assign the second processor with the second processor identity to process the second data packet comprises:
   process the second data packet according to a security policy by the second processor.

18. The computer program product of claim 17, wherein the security policy comprises one or more of the following: virus detection; traffic quota violation; lawful data interception; and phishing.

19. The computer program product of claim 12, wherein the selected proxy network address comprises an IP address.

20. The computer program product of claim 19, wherein the selected proxy network address further comprises a TCP or UDP port.

21. The computer program product of claim 12, wherein the calculated first processor identity is based at least in part on a computed sum of an IP address for the server network address and an IP address for the host network address.

22. The computer program product of claim 12, wherein the calculated second processor identity is based at least in part on a computed sum of an IP address for the proxy network address and an IP address for the server network address.

\* \* \* \* \*